United States Patent [19]
Herbert

[11] Patent Number: 5,910,879
[45] Date of Patent: Jun. 8, 1999

[54] 3- AND 4-TERMINAL CAPACITORS WITH "FARADAY-SHIELDED" CONNECTIONS

[76] Inventor: Edward Herbert, 1 Dyer Cemetery Rd., Canton, Conn. 06019-2029

[21] Appl. No.: 08/876,299

[22] Filed: Jun. 16, 1997

Related U.S. Application Data

[60] Provisional application No. 60/621,121, Jun. 27, 1996.
[51] Int. Cl.$^6$ .......................... H01G 4/228; H01G 4/232
[52] U.S. Cl. .................. 361/306.1; 361/307; 361/308.3; 361/309; 361/306.3
[58] Field of Search .............................. 361/301.2, 302, 361/306.1–306.3, 307, 308.1–308.3, 309–310; 333/182; 174/143

[56] References Cited

U.S. PATENT DOCUMENTS

3,097,330  7/1963  Fischer .
4,148,003  4/1979  Colburn et al. .
5,544,002  8/1996  Iwaya et al. .

*Primary Examiner*—Kristine Kincaid
*Assistant Examiner*—Anthony Dinkins

[57] ABSTRACT

A tubular capacitor made of metallized film may be drilled through to its hollow center during its manufacture, and any resulting short circuits may be cleared by the application of electrical energy. Third and fourth leads may be attached to end caps on their inside surface, and the leads can be brought out through the through hole. The end caps may have a thickness that is large compared to the penetration depth at a frequency of interest. The capacitor may be used as a four terminal capacitor, for instance, in a switched mode power supply filter, and it will have superior rejection of high frequency AC noise. The two internally connected leads may also be used as a low inductance alternative connection for a two terminal capacitor.

13 Claims, 7 Drawing Sheets

3- AND 4-TERMINAL CAPACITORS WITH "FARADAY-SHIELDED" CONNECTIONS

This is a continuation in part application of a provisional application of the same name, Ser. No. 60/621,121, filed Jun. 27, 1996. Priority is claimed to that filing date.

BACKGROUND OF THE INVENTION

This invention relates to capacitors, and in particular 3- and 4-terminal capacitors.

Reference is made to a co-pending patent application "HIGH CURRENT, LOW INDUCTANCE CAPACITOR PACKAGES, Ser. No. 08/840424 filed Apr. 29, 1997; U.S. Pat. No. 5,659,455 "PACKAGING FOR ELECTRONIC CIRCUITS USING A CAPACITOR AS A STRUCTURAL MEMBER", issued Apr. 19, 1997; and to U.S. Pat. No. 4,916,576, "MATRIX CAPACITOR", filed Feb. 27, 1989 and issued Apr. 10, 1990.

3- and 4-terminal capacitors are sometimes used to reduce the effects of "lead inductance" in a capacitor. As an example, not a limitation, they may be used in low-pass filtering applications, such as the input and output filter capacitors in switched mode power supplies. A feed-through capacitor can be considered to be a kind of a 3-terminal capacitor.

BRIEF DESCRIPTION OF THE INVENTION

A pair of wires conducting an electrical current from a power source which were terminated on the inside of an ideal Faraday shield will be short circuited, and a pair of leads connected anywhere on the exterior of the ideal Faraday shield will detect no potential at DC (direct current) or any AC (alternating current) frequency from the power source. For a less than ideal Faraday shield, the potential on the exterior of the Faraday shield will be small, and can be determined by the current flow and the impedance, using network analysis, as in well known in the art of electrical engineering. At high frequency, the potential on the exterior of a Faraday shield made of a continuous conductor such as copper sheet metal will be further attenuated because AC currents tend not to penetrate a conductor, and thus will tend not to penetrate from the inside to the outside (or from the outside to the inside).

As taught in the copending patent application "PACKAGING FOR ELECTRONIC CIRCUITS USING A CAPACITOR AS A STRUCTURAL MEMBER" referenced above, a package comprising a top metal plate and a bottom metal plate and side walls which are a capacitor is a Faraday shield for AC at frequencies sufficiently high that the capacitor has a low impedance. High frequency noise from an electronic circuit within the package will be significantly attenuated outside of the package.

This invention teaches that the same phenomenon can be used in the construction of a 3- or 4-terminal capacitor, by connecting one or two of the three or four leads to the terminations of the capacitor from inside the capacitor. The lead(s) can then pass through the side of the capacitor to enable connection to a circuit.

BRIEF DESCRIPTION OF THE FIGURES

FIG. 6 shows a three terminal capacitor in which the third terminal is connected to the inside surface of a first end cap. The second end cap encloses a conduit through which the third terminal can pass, so that capacitor types which are not easily drilled through may be used. FIG. 6 also shows concentric capacitor elements and that a feed through capacitor can be used to increase the attenuation at high frequencies.

PREFERRED EMBODIMENT OF THE INVENTION

As additional background in understanding this invention, one must understand the "Faraday shield" and the concept of "penetration depth" as it relates to high frequency AC. Also, one should have some knowledge of the construction of capacitors, particularly metalized film capacitors.

The ideal "Faraday shield" comprises a perfectly conductive enclosure defining an interior space. No electric fields can penetrate into or penetrate out of the Faraday shield, since, as it is a perfect conductor, there can be no voltage gradients on its exterior or interior surface.

If one were to construct a metal sphere and put a power source inside it with electrical connections to diametrically opposite points, ideally no electric potential can exist between the points. In practice, there will be some finite impedance in the sphere, so some potential difference will exists, and this potential difference can be calculated as the current flowing times the impedance. For a DC or low frequency AC, the same potential difference would be present at the corresponding points on the exterior of the sphere.

The above referenced patent application "PACKAGING FOR ELECTRONIC CIRCUITS USING A CAPACITOR AS A STRUCTURAL MEMBER" teaches that a band around a Faraday shield can be replaced with a capacitor. Specifically, an enclosure is disclosed comprising a top conductive plate, a bottom conductive plate, and side walls which comprise a capacitor. An ideal capacitor has an infinite impedance at DC and has zero impedance at an infinite frequency AC. Thus an AC Faraday shield can be constructed which can pass a DC current between its interior and exterior with no short circuit DC flowing through the capacitor in the AC Faraday shield. However, high frequency AC will be effectively short circuited by the capacitor.

As further background, a high frequency AC tends to flow on the surface of a conductor, and has a "penetration depth" into the surface of a conductor, as is well known to one skilled in the art. This penetration depth is an exact number, which can be calculated using well known equations, given the frequency of the AC and the properties of the conductor. The "penetration depth" terminology can be misleading unless one understands its definition and application. With respect to a wire conductor which is carrying a high frequency AC, the high frequency AC tends to flow near the surface of the conductor, so the conductor has a higher "apparent resistance" than the same conductor carrying a DC or low frequency AC. The "penetration depth" is a conceptual factor, being the wall thickness of a tube of the same outside diameter as the wire which has a DC conductivity corresponding to the apparent resistance.

It is sometimes believed, mistakenly, that AC current flows very well on the surface to the depth of the "penetration depth", and does not flow at all at deeper depths. In actuality, the penetration of the high frequency AC into a thick conductor is much greater than the "penetration depth", but AC is increasingly attenuated and also has an increasing phase difference as the distance from the surface increases. At some point below the surface of the conductor, the AC will have a 180 degree phase shift, and so will flow in the opposite direction, significantly attenuated. In a homogeneous conductor, the magnitude of the current density decreases below the surface as a log function.

If a wire conductor of an AC passed through the center of a metal disk having a thickness large compared to the penetration depth, the AC does not flow through the disk, but rather most of the AC will flow outward along its surface, around the edge, then back along the other surface to the wire again. If two such disks were connected by a closed metal tube having a thickness large compared to the penetration depth, so as to comprise an enclosure, very little AC will flow on the inside of the tube or on the enclosed surfaces of the disks. Also, a wire connecting the centers of the enclosed surfaces of the disks will carry very little AC.

(In this specification and the claims, the term "having a thickness that is large compared to the penetration depth" means a thickness sufficient to provide the degree of attenuation of the AC that is needed for a particular application. If it is required that very little AC penetrate, then the thickness might be several times the penetration depth as determined by the commonly used formula and definition. On the other hand, if only a small attenuation is sufficient for the application, the thickness might be less than the penetration depth as determined by the commonly used formula and definition, it being related to the needs of the application rather than any other standard or definition.)

On the other hand, a DC will penetrate the disks quite readily, and current flow will divide between the outside tube and the inside wire in proportion to their DC resistance.

Finally, consider that the outside tube may be cut around, blocking DC and low frequency AC, and a capacitor element may be fitted to restore the circuit for high frequency AC. No DC currents can flow through the tube, and very little high frequency AC will flow through the interior wire.

As background, a metalized film capacitor comprises insulating films which have been "metalized", that is upon which a thin metal layer has been deposited. The metal may be selectively deposited or selectively removed so that there is an insulating margin on one or the other edge of a long strip of metalized film. When wound or stacked having the insulating margins on alternate ends, the ends can be metal sprayed, each end making contact with half of the metalized film alternately, so as to comprise a capacitor, as is well known to one skilled in the art.

Metalized film capacitors have the property that they can "heal", that is, if the alternating metalized layers should short circuit, as through a pin hole or the like, an electric current can be used to "clear" the short. In making stacked film capacitors, the capacitors are often made in long lengths, then they are sawed to short lengths, the length being one determinant of the value of the finished capacitor. The process of sawing the capacitor creates many localized short circuits, and these are cleared with electrical energy to make a capacitor with good electrical integrity and reliability. This is a routine manufacturing process, as would be known to one skilled in the art.

Similarly, a metalized film capacitor can be drilled through, and the resulting localized short circuits can be cleared. This can provide access to the interior of the capacitor.

Figure 1:
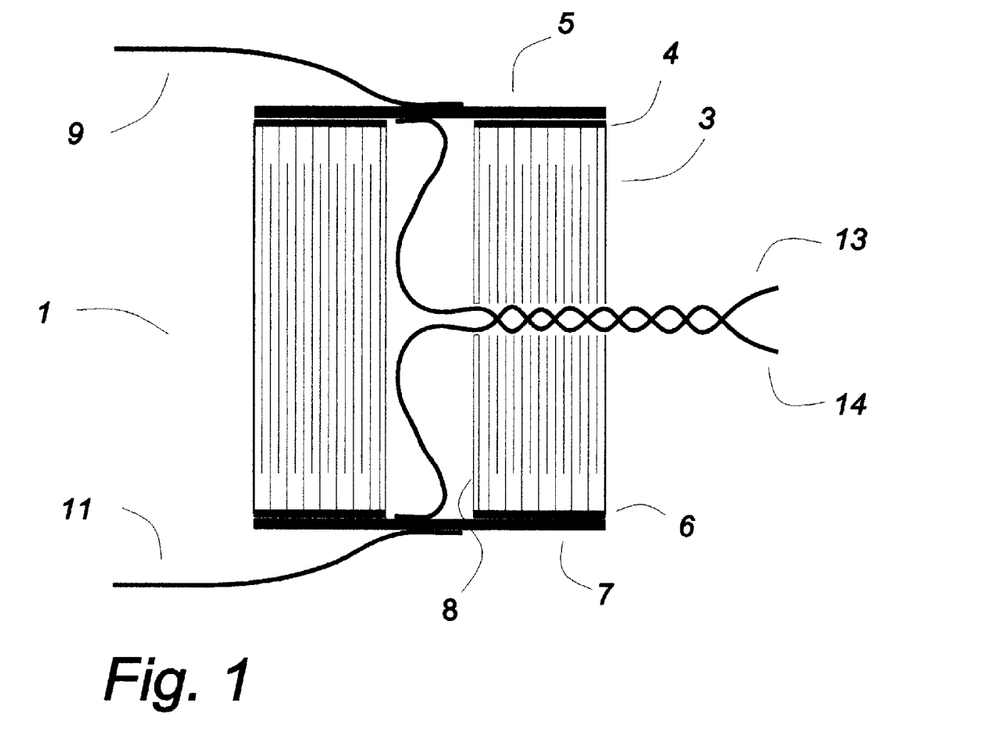
FIG. 1 shows a four terminal capacitor in which two of the terminals are connected to the inside surfaces of the end caps.

With the above as background, FIG. 1 shows a four terminal capacitor 1 in section. A capacitor element 3 may be a tubular coil wound of metalized film upon a mandrel 8, a very common construction for capacitors. The layers of the capacitor element are extremely thin, too thin to draw, so they are represented diagramatically. The alternating layers (electrodes) of the capacitor element 3 may connect respectively to metallized ends 4 and 6. This is a common construction for capacitors, as would be known by one skilled in the art.

The capacitor 1 further comprises metal ends 5 and 7, which could be, as an illustration, not a limitation, copper disks, copper caps or the like, or perhaps a particularly heavy metallization. The capacitor 1 may have wire terminals 9 and 11 bonded to the metal ends 5 and 7, which closely resembles conventional capacitor construction.

The capacitor element 3 has been drilled through so as to provide access for two additional wire terminals 13 and 14 which are bonded to the inside surface of the metal ends 5 and 7.

Usually, in the construction of tubular metalized film capacitors, the film is wound with some minimal wasted space in the middle left when the mandrel upon which it is wound is removed. The ends may be metal sprayed, and a small hole may be left in the center. The capacitor 1 of FIG. 1 must have sufficient space left in the center of the capacitor element 3 so that the hole can be drilled through the side of the capacitor element 3 and the wire terminals 13 and 14 can be threaded through. It is preferred (but it is not necessary)

that a tubular mandrel 8 be used and that it be left in place. When the hole is drilled through the capacitor element 3, any resulting short circuits must be cleared. The edges of the hole may be protected and stabilized in some manner, for example and not as a limitation, by coating with a sealant or bonding in an insulating sleeve. Alternatively, the wire terminals 13 and 14 may be of insulated wire, and a dab of sealant could simultaneously protect and stabilize the hole, locate the wire terminals 13 and 14 in place and seal the capacitor 1.

The wire terminals 13 and 14 may be attached to the metal ends 5 and 7 before the metal ends 5 and 7 are fixed to the ends of the capacitor element 3. The metal ends 5 and 7 are preferably thick compared to the penetration depth for any high frequency AC which it is to be attenuated, and it is preferred that they cover the entire end of the capacitor 1. At a minimum, any holes should be covered.

Consider, as an illustration, not a limitation, that the capacitor 1 of FIG. 1 may be used in a filter network for a switched mode power converter. One side of the power circuit might comprise wire terminals 9 and 13, while the return side might comprise wire terminals 14 and 11. For a DC, wire terminal 9 is directly connected to wire terminal 13 through the metal end cap 5. Similarly wire terminal 14 is directly connected to wire terminal 11 through the metal end cap 7.

Consider further that there may be a high frequency AC noise source connected to wire terminals 9 and 11. This is a common occurrence in a switched mode power supply. and capacitors are often used to attenuate the high frequency AC noise. Very little of the high frequency AC can penetrate the metal end caps 5 and 7, so the AC will flow across the surface of the metal end caps 5 and 7. In the absence of the capacitor element 3, the currents would then flow back along the other side of the end caps to the wire terminals 13 and 15. However, the capacitor element 3 provides a short circuit path for high frequency AC between the wire terminals 9 and 11.

Further, the flow of high frequency AC is blocked from flowing along the inside surface of metal end caps 3 and 7 by a plurality of metal layers, comprising the metalized surfaces of the metalized film of which the capacitor element 3 is constructed. As the high frequency AC tries to flow from the outside to the center of the metal end caps 5 and 7, it will encounter a succession of metal surfaces. These metal surfaces are extremely thin, so the AC can penetrate any one of them substantially, but with some attenuation at each. Because there are a very large number of layers, the cumulative effect is that the high frequency AC will be significantly attenuated. Thus not only does the capacitor element 3 provide a short circuit between the metal end caps 5 and 7 for high frequency AC, but it also provides an effective barrier to high frequency AC between wire terminals 1 and 13 and between wire terminals 14 and 11.

This effect will be enhanced if the capacitor element 3 is relatively thick from its inside diameter to its outside diameter, and relatively short, from end to end.

The capacitor 1 of FIG. 1 has utility as a two terminal capacitor as well. When terminated only by the internal leads 13 and 14, the capacitor 1 is a superior two terminal capacitor having low "lead" inductance. A two terminal configuration using one internal lead 13 or 14 and one external lead 11 or 9 has unique characteristics which may be useful in some circuits. If the connections are to opposite ends, one internal and one external, DC is blocked and high frequency AC is attenuated. If the connections are to the same end, one external and one internal, DC is conducted well but high frequency AC is attenuated.

Figure 2:
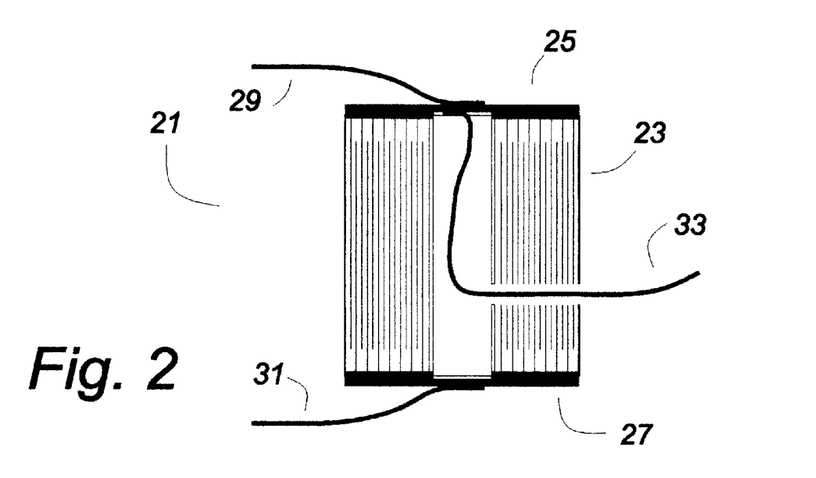
FIG. 2 shows a three terminal capacitor in which one of the terminals is connected to the inside surface of one end cap.

FIG. 2 shows a three terminal capacitor 21 which is similar in many ways to the capacitor 1 of FIG. 1. A capacitor element 23 has metal end caps 25 and 27 to which wire terminals 29 and 31 are bonded on the outside. A third wire terminal 33 is bonded to the inside surface of metal end cap 25. High frequency AC flow from wire terminal 29 to wire terminal 33 will be significantly attenuated. As an example, if a high frequency AC noise source is connected to wire terminals 29 and 31, the high frequency AC noise will be significantly attenuated at a load connected to wire terminals 33 and 31, but DC can flow unimpeded.

Figure 3:
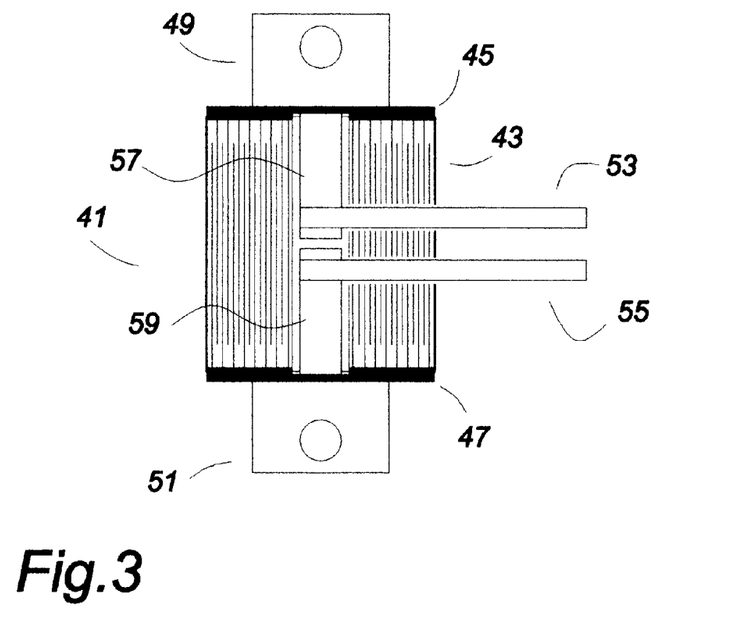
FIG. 3 shows a four terminal capacitor having very heavy leads and terminations, for high currents.

The capacitor 41 of FIG. 3 is constructed to carry large DC. A capacitor element 43 is connected to metal end caps 45 and 47. Large terminals 49 and 51 are bonded to the outside surfaces of the metal end caps 45 and 47. Heavy metal studs 57 and 59 are bonded to the inside surfaces of the metal end caps 45 and 47. Heavy wire terminals 53 and 55 are connect to the heavy metal studs through holes drilled in the capacitor element 43.

End cap assemblies may be made ahead of time, comprising, for example, the metal end cap 45, the large terminal 49 and the heavy metal stud 57, pre-drilled to accept a heavy wire terminal 53. A pair of these assemblies can be inserted into the ends of the capacitor element 43, and bonded to the respective metallized ends of the capacitor element 43, as by soldering, as an illustration, not a limitation. The heavy wire terminals 53 and 55 can be installed through holes in the capacitor element 43. The heavy wire terminals 53 and 55 can be attached to the heavy metal studs 57 and 59 in any of several ways, for example but not as a limitation, by press fit, by machine thread, or by reflow soldering or a combination thereof It is also possible that the heavy wire terminals 53 and 55 would not be part of the capacitor 41 as it was made. There could be only the through holes in the capacitor element 43 and holes in the heavy metal studs 57 and 59, to later receive the heavy metal terminals 53 and 55 as plugged in terminals when the capacitor 41 is installed in an assembly.

Figure 4:
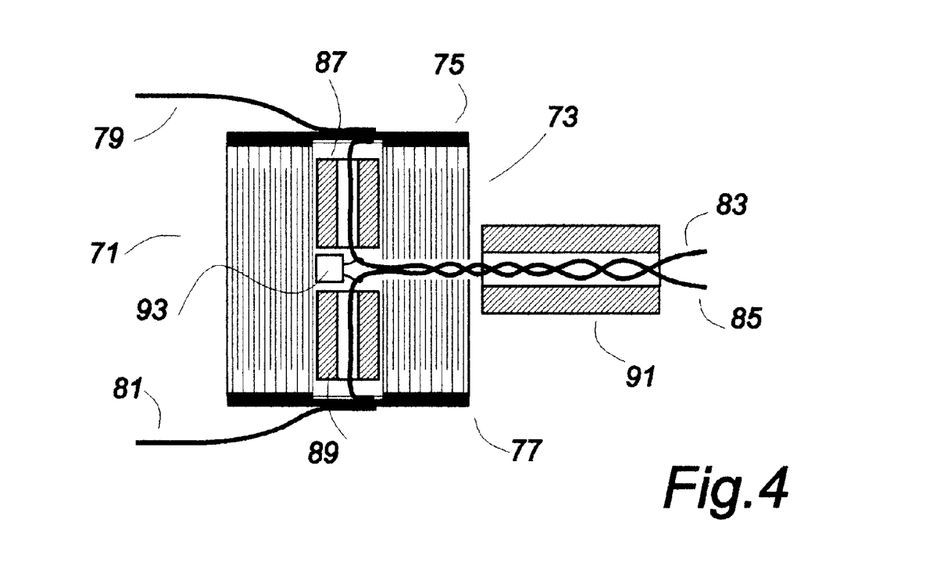
FIG. 4 shows that a four terminal capacitor may comprise additional components for further attenuation of noise.

FIG. 4 shows that a capacitor 71 may comprise additional components to further attenuate high frequency AC noise or to damp resonant oscillations. A capacitor element 73 has metal end caps 75 and 77. Wire terminals 79 and 81 are bonded to the metal end caps 75 and 77. Wire terminals 83 and 85 pass through a hole in the capacitor element 73 and are bonded to the inside surface of the end caps 75 and 77.

Additional components may be installed to further attenuate high frequency AC noise, as an example for illustration and not as a limitation, a small high frequency capacitor 93 may be located and connected internally to the wires 83 and 85. Differential mode filters 87 and 89, and/or a common mode filter 91 could also be installed. All of the filters could be inside the capacitor element 73 or outside of it, or partly inside and partly outside, as shown. The common mode filter 91 could line the hole in the capacitor element 91 as a combined filter and sleeve, particularly if it were of an insulating material such as nickel-zinc-ferrite. The filters may be of sintered powdered iron or of ferrite, as examples, not as limitations. In addition, or alternatively, such additional components may be used to damp out resonant oscillations.

Figure 5:
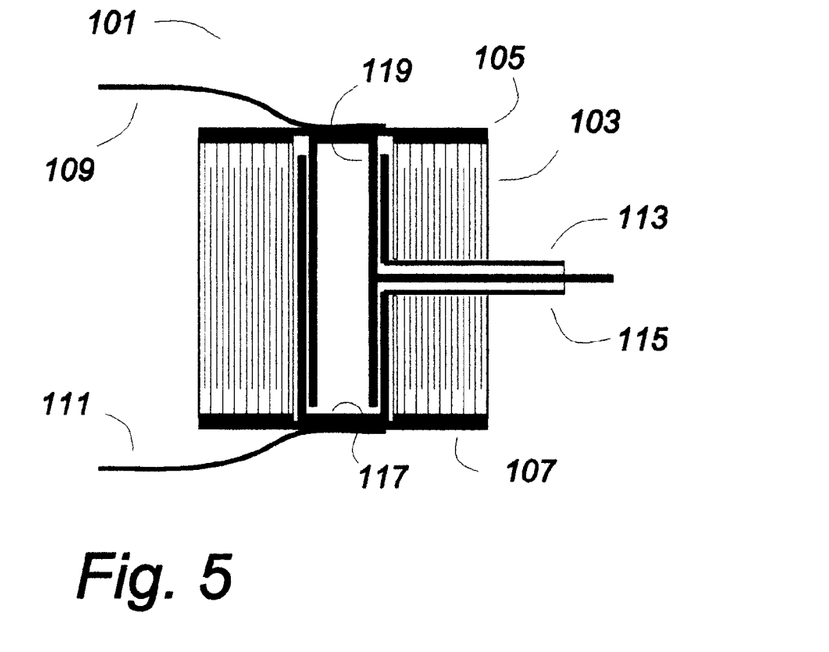
FIG. 5 shows that heavy, overlapped but insulated conductors may be used, to enhance shielding and/or improve heat transfer, and coaxial termination.

FIG. 5 shows that heavy metal inserts 117 and 119 may be added to a four terminal capacitor 101. A capacitor element 103 has metal end caps 105 and 107, with wire terminals 109 and 111 bonded thereto. Coaxial wire terminals 113 and 115 pass through a hole in the capacitor element 103 and are bonded respectively to the heavy metal inserts 117 and 119. The heavy metal inserts 117 and 119 are bonded respectively to the metal end caps 105 and 107, The heavy metal shields 117 and 119 overlap but are separated by a thin layer of electrical insulation, too thin to draw, and thus not illustrated, to prevent a short circuit for DC. Each is bonded to one of the end caps 105 and 107. The thin overlapped but insulated joint is a capacitor itself, and will provide some additional attenuation for high frequency AC noise. The metal shields 117 and 119 are very good conductors, so heavy DC may be conducted without significant heating, and the metal shields 117 and 119 would be beneficial in conducting any such heat from the interior of the capacitor. They would also increase the strength of the finished assembly. As an alternate construction, they could be on the outside of the capacitor 101.

Figure 6:
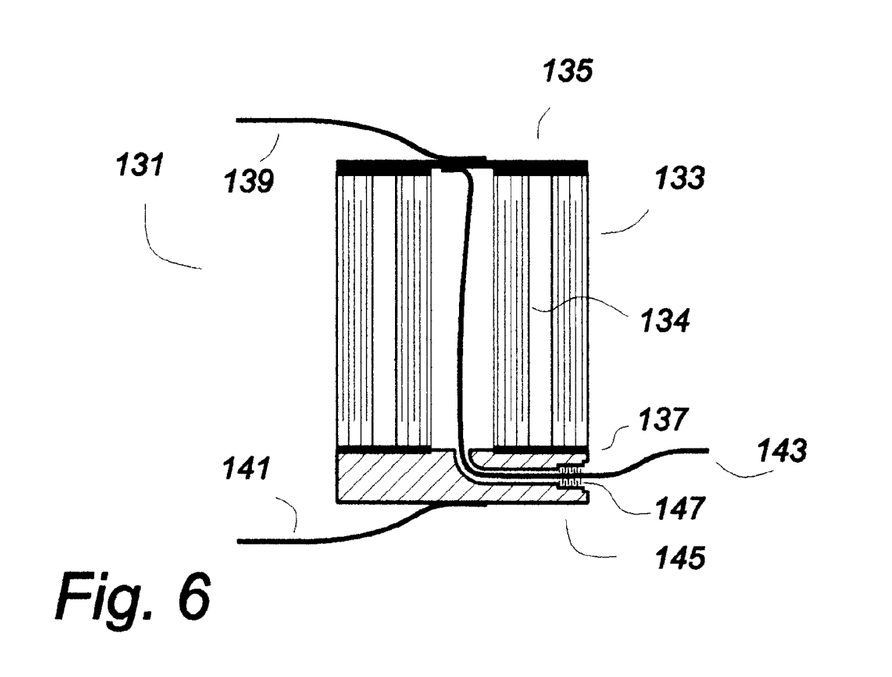

The three terminal capacitor 131 of FIG. 6 has two concentric capacitor elements 133 and 134 in parallel. The internally connected wire terminal 143 need not pass through the capacitor elements 133 and 134. While metalized film capacitors may be drilled and cleared of localized short circuits, with other types of capacitor construction this may be difficult or impossible. The capacitor elements 133 and 134 are concentric, and are bonded on one end to a metal end cap 135 to which a wire terminal 139 is bonded. They are bonded to a much more substantial second end cap 145 on the other end, with a wire terminal 141 bonded thereto. The second end cap has therein a conduit 137 through which a wire terminal 143 may pass so as to be connected to the inside surface of the end cap 135.

FIG. 6 shows that the wire terminal 143 optionally can pass through a feed through capacitor 147 in the second end cap 145 to further attenuate high frequency AC noise.

Capacitors of different types are sometimes used in parallel to take advantage of differences in their characteristics to improve the whole. One element might be an extended foil capacitor paralleled with a second element which might be a metalized foil capacitor. Other types of capacitors might be used, and as illustrations, not limitations, they might not be concentric, or they could be if different lengths, the end caps having contours to accommodate any physical differences to make a good electrical connection.

Figure 7:
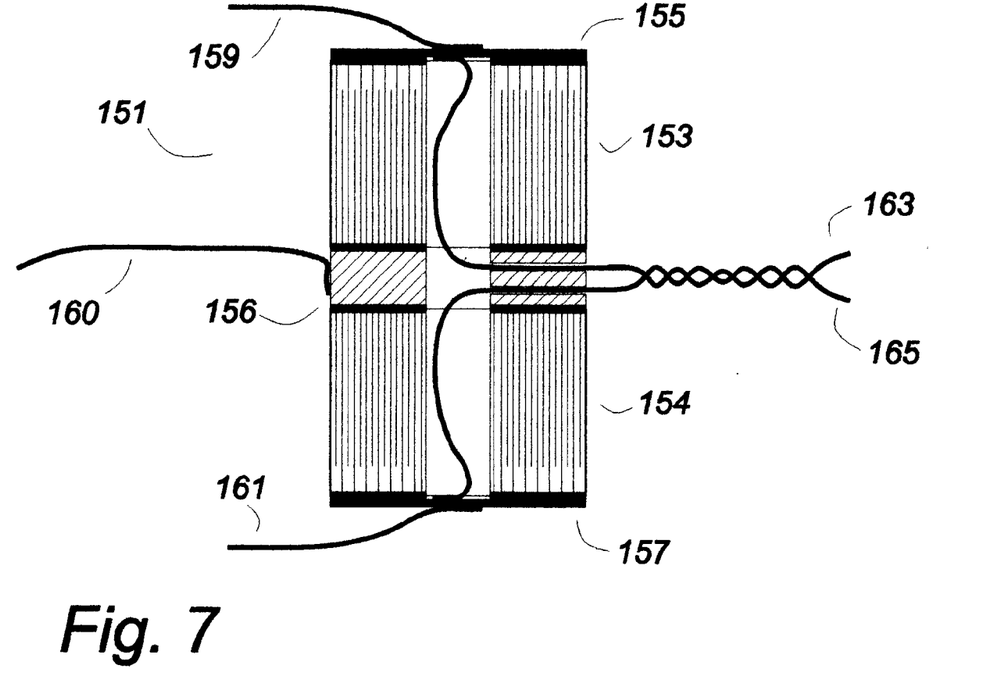
FIG. 7 shows a five terminal capacitor, essentially comprising a pair of three terminal capacitors connected together in series.

FIG. 7 shows a five terminal capacitor 151. A first capacitor element 153 has an end cap 155 having a wire terminal 159 bonded thereto. A second capacitor element 154 has an end cap 157 having a wire terminal 161 bonded thereto. The first and second capacitor elements 153 and 154 are bonded to a central metal connection 156 having a wire terminal 160 bonded thereto.

The central metal connection 156 further has two conduits therein so that wire terminals 163 and 165 can pass through and connect to the end caps 159 and 161. Thus the capacitor 151 comprises two capacitor elements in series. If they have equal capacitance, such a construction would be useful in the familiar half-bridge circuit. As an example and not a limitation, a source of DC power could be connected to the wire terminals 163 and 165. The connections to the half bridge circuit could be the wire terminals 159, 160 and 161. High frequency AC noise originating in the half bridge circuit would be substantially attenuated at the DC power source. As an illustration, not a limitation, the capacitor elements 153 and 154 could be of a construction which are less practical to be drilled through, such as wound foil.

A number of variations in this general construction would be possible the wires 163 and 165 could pass through holes in one or the other or both of the capacitor elements 153 and 154. In this were done, the metal connection 156 could be a thin metal ring, perhaps with a tab extending outward (and/or inward) for connection to the wire 160. The wire 160 could be internally connected to the metal connection 156, exiting with the wires 163 and 165 to make an alternative five terminal capacitor. More sections could be used, terminated in a variety of ways.

Figure 8:
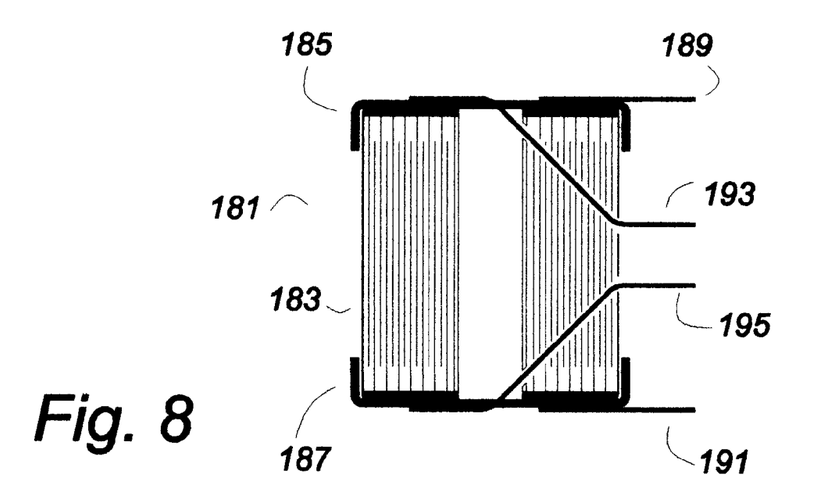
FIG. 8 shows a wound four terminal capacitor in which the third and fourth terminals are connected to the end caps through holes drilled on a diagonal.

As shown in the capacitor 181 of FIG. 8, the threading of the terminal wires 193 and 195 through the capacitor element 183 to the end caps 185 and 187 may be simplified and more easily automated if the holes in the capacitor element 183 were drilled diagonally, straight through the end caps 185 and 187. Further, the extra space left in the center of the capacitor element 183 could be very small, much smaller than shown, as the wires 193 and 195 do not need to be threaded through the center. Performance would not be greatly effected if the holes in the end caps 185 and 187 were somewhat off center.

Close inspection of FIG. 8 shows that the wire terminals 193 and 195 pass through holes in the metal end caps 185 and 187 and are bonded to the outside surfaces. This may be easier for assembly in some instances, and it is immaterial to which side of the metal end 185 and 187 the terminals 193 and 195 are physically bonded as long as any space around the wire terminals 193 and 195 in the metal end caps 185 and 187 is substantially filled with a good conductor, such as solder. This places the effective bond on the inside surface and the phrase "bonded to the inside surface" as used in this specification and the claims includes this construction as well as any other which accomplish a similar electrical result.

The wire terminals 189, 191, 193 and 195 may all be physically bonded to the outside of the end caps 185 and 187. As long as solder substantially fills the hole around the wire terminals 193 and 195 in the end caps 185 and 187 the wire terminals 193 and 195 are effectively bonded to the inside surface of the end caps 185 and 187. The capacitor 181 is well suited to printed circuit board use. A surface mount variant could be easily made by bending the wire terminals 193 and 195 back parallel to the capacitor element 183. The wire terminals 189 and 191 would then not be needed, as the end caps 185 and 187 would be suitable for use as surface mount terminations.

In this embodiment, the end caps 185 and 187 are drawn cups, a construction which could be used alternatively in many of the embodiments shown.

Figure 9:
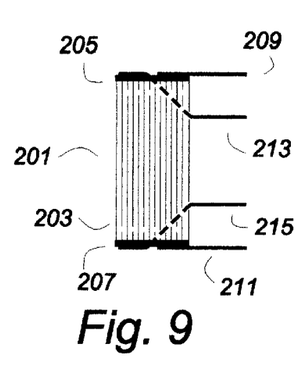
FIGS. 9 and 10 show a section and a bottom view of another embodiment of this invention using a stacked film capacitor body.
Figure 10:
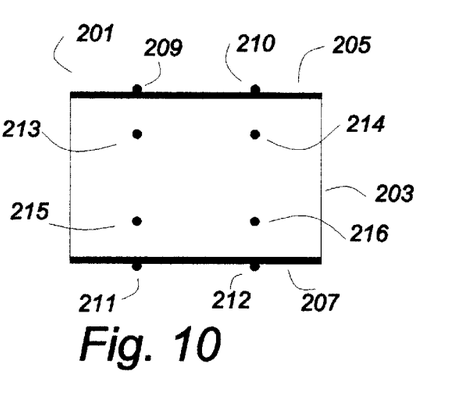

FIGS. 9 and 10 show a capacitor 201 in end and bottom view respectively. The capacitor element 203 is a stacked metalized film capacitor having metalized ends 205 and 207. Wire terminals 213, 214, 215 and 216 may pass through drilled holes and may be bonded to the metalized ends 205 and 207. As long as solder fills any voids around the wire terminals 213, 214, 215 and 216 in the metalized ends 205 and 207, the wire terminals 213, 214, 215 and 216 are effectively bonded to the inside surface of the metalized ends 205 and 207. Wire terminals 209, 210, 211 and 212 are bonded to the outside of the metalized ends 205 and 207. Although having eight leads, this is equivalent to a four terminal capacitor, the extra leads serving to increase the current carrying capacity of the capacitor 201 and distribute the current more evenly.

Although the capacitor 201 of FIGS. 9 and 10 does not have the multiple layers of continuous metalized film that the capacitors of FIGS. 1 through 8, there still is provided a substantial spacing filled with alternating capacitor layers between the inside connection of the leads to the edge of the metalized ends, so much of the advantage of inside connection of the wound capacitors will be retained. High frequency AC does not readily penetrate the capacitor element even though it appears to have a path to follow along the metalized layers of the capacitor. For longer stacked film capacitors, any number of sets of wire terminals may be used for greater current capacity and to better distribute the current, as long as they are not too near the edge of the metalized ends.

Stacked metallized film capacitors typically have a fairly heavy metallization, often of aluminum and/or babbitt or the like. These metals have a lower conductivity than copper, so the penetration depth will be greater. If necessary, the metallization can be supplemented with a sheet of copper bonded to the surface thereof. The increased thickness and the lower conductivity of the surface will have relatively more AC attenuation through the material.

Figure 11:
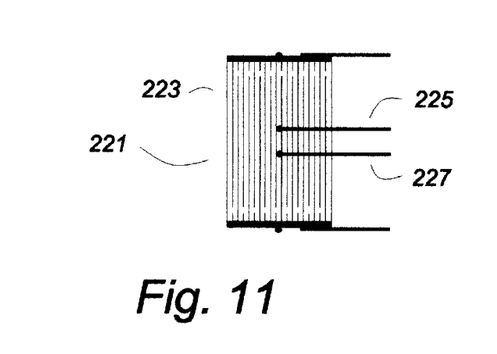
FIGS. 11 and 12 show a end and a bottom view of another embodiment of this invention using a stacked film capacitor body.
Figure 12:
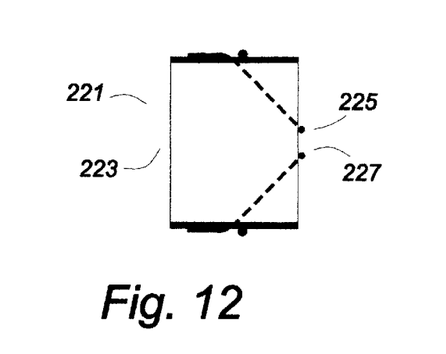

The capacitor 221 of FIGS. 11 and 12 is very similar to the capacitor 201 of FIGS. 9 and 10, except that the leads 225 and 227 are drilled diagonally in the plane of the stacked foils.

Figure 13:
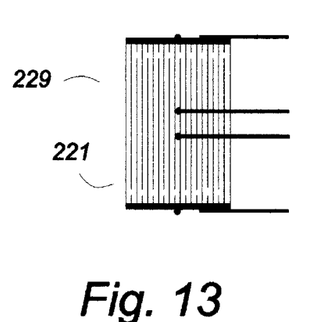
FIGS. 13 and 14 show a end and a bottom view of another embodiment of this invention using a pair of stacked film capacitor bodies.
Figure 14:
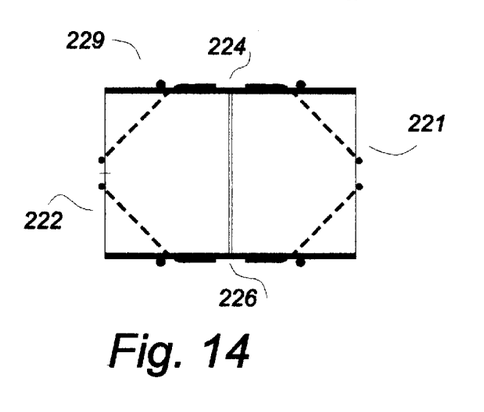

The capacitor 229 of FIGS. 13 and 14 comprises two capacitor elements 221 and 222, which are the same as the capacitor 221 of FIGS. 11 and 12. This shows that the capacitors may be connected in series through connections 224 and 226. The resulting capacitor 229 may be used as a four terminal capacitor having more attenuation. With easy access to all of the various terminations, the capacitor 229 could be used as a three terminal capacitor, a four terminal capacitor, a five terminal capacitor or a six terminal capacitor. With additional capacitor elements, a number of imaginative circuits and networks could be made.

Figure 15:
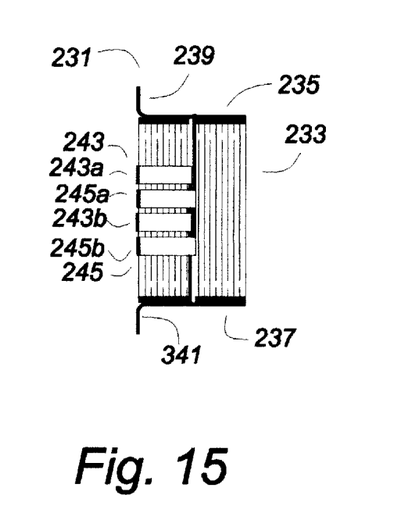
FIGS. 15 and 16 show a side and top view of another embodiment of this invention using a stacked film capacitor body having heavy foil terminations for high current.
Figure 16:
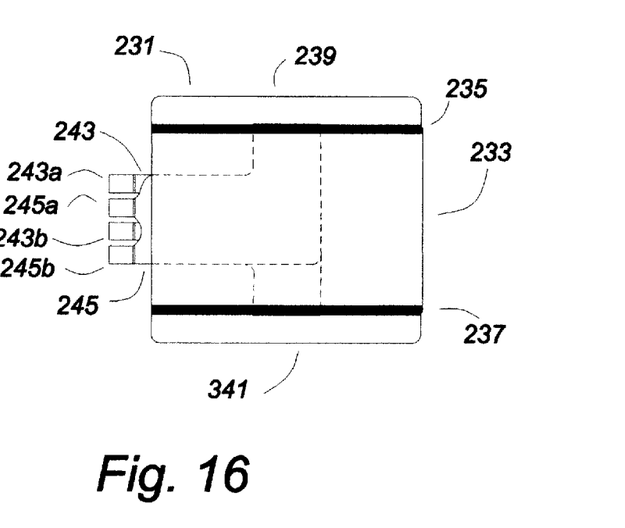

FIGS. 15 and 16 show an alternate method of terminating a stacked film capacitor. The capacitor 231 comprises a capacitor element 233 having metal sprayed ends 235 and 237 having large "L" shaped terminals 239 and 341 bonded respectively thereto for carrying high currents. Heavy metal foil terminals 243 and 245 connect to the inside surface of the metal sprayed ends 235 and 237. In practice, stacked film capacitors are often made with a plurality of thinner stacked sections, one placed atop another until the desired total number of layers is achieved for the capacitance value needed. The foil terminals 243 and 245 may be placed between such intermediate sections. Additional similar sets of foil terminals may be used to increase the current capacity of the capacitor. Then when the ends are metal sprayed, connection to the heavy metal foil terminals will be made as well. Care should be taken to be sure that the heavy metal foils are exposed on the surface of the ends of the capacitor when the ends are metal sprayed.

For surface mounting to a circuit board with minimum inductance, the foil termials 243 and 245 may have multiple alternating surface mounting pads 243a, 245a, 243b and 245a. Obviously, a number of alternative mounting and terminating schemes could be used, as would be apparent to one skilled in the art.

In making a capacitor in the style of FIGS. 15 and 16, the foil terminals 243 and 245 may be immediately adjacent to each other (it being understood that they must be insulated), or there may be one or more intermediate sections of the capacitor element between them. The electrical characteristics will be somewhat different, and one or the other may be preferred in different applications.

Figure 17:
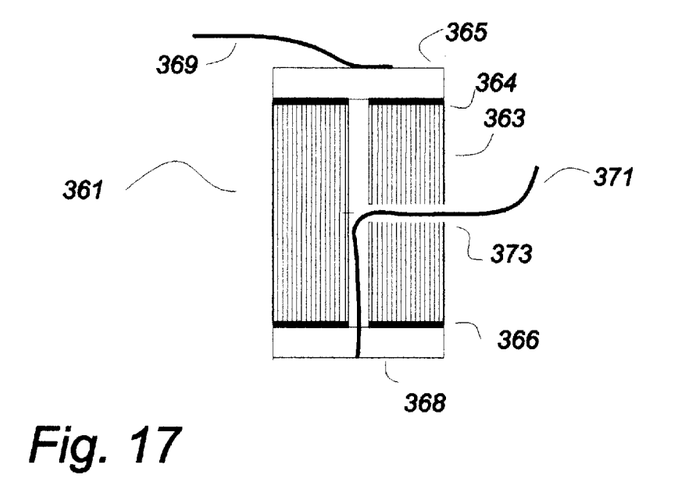
FIG. 17 shows a degenerate capacitor, having only one electrode with heavy metal end caps on both ends, nominally common because of the one electrode connects both. The degenerate capacitor has two (or more) terminations. In its most basic form, one termination is on the outside one is on the inside through a hole in the capacitor element.

FIG. 17 shows a "degenerate" capacitor 361. A "capacitor element" 363 comprises a coil of metallized film, as an example not a limitation, or a coil of foil interleaved with film. The "capacitor element" 361 has metallization 364 and 366 on its respective two ends to which heavy metal end caps 365 and 368 respectively have been bonded. An external lead 369 bonds to one end cap 365 on its outside surface. An internal lead 371 bond to the other end cap 368 on its inside surface and exits the "capacitor" through a hole 373 in the side wall of the capacitor 361. This device passes a DC, and high frequency AC is delayed and attenuated.

Figure 18:
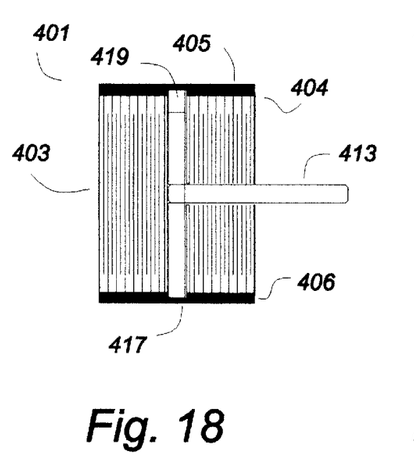
FIGS. 18, 19 and 20 show that the capacitor element can be flattened to an oval, with broad flat studs inside connecting through holes in the capacitor element to heavy studs. This can be a two terminal capacitor, internally connected, or it can be a four terminal capacitor if connections are made to the metal end caps on the outside as well.
Figure 19:
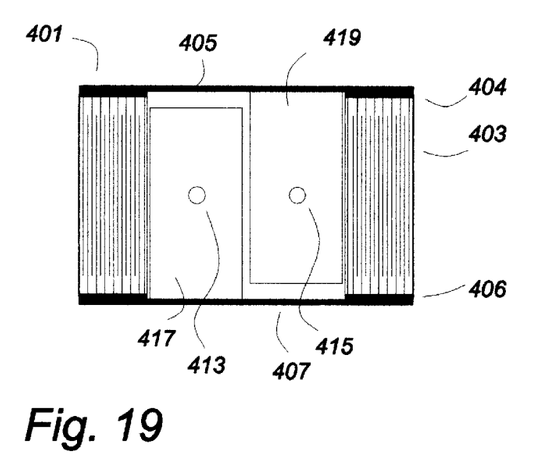
Figure 20:
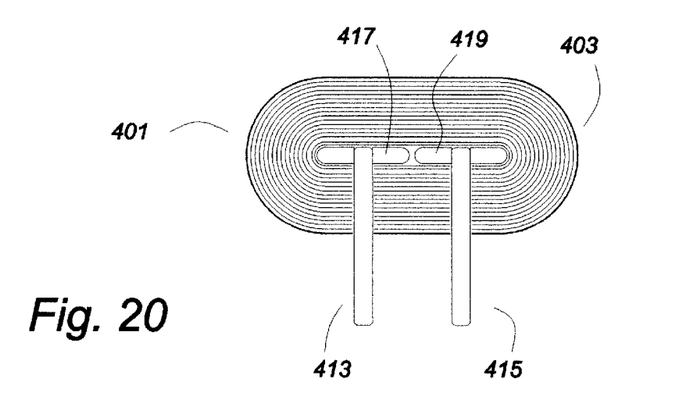

FIGS. 18, 19 and 20 show section views from three sides of a capacitor 403 in which the capacitor element 403 is an oval. Frequently, film capacitors are made in an oval shape, often by winding a round capacitor element with ample space in the center, then flattening it by lateral pressure. Two heavy metallized end caps 405 and 407 are bonded respectively to heavy flat metal studs 419 and 417 and to the metallized ends 404 and 406 of the capacitor element 403. Heavy metal terminals 413 and 415 are bonded to the heavy metal studs 417 and 419 respectively and exit the capacitor 401 through holes in the capacitor element 403.

This capacitor 401 may be used as a two terminal internally connected capacitor. Alternatively, it may be used as a four terminal capacitor in additional connections to an external circuit are made to the heavy metal end caps 405 and 407.

In this specification and the claims, the term "tubular" includes oval shapes and other many other shapes, it being recognized that "tubes" come in a variety of geometries, including but not limited to round, oval, square, hexagonal, octagonal, etc., and "tubular" would even encompass fabricated tubes, for example, not as a limitation, a square tube fabricated of four stacked film capacitors with mitered or butt joints as corners.

One skilled in the art of capacitors will readily understand that the teachings of this invention may be applied to a wide variety of capacitors for a wide variety of applications. As an illustration, not a limitation, some electrolytic capacitors are made of wound foil or sintered metal. Some multiple layer ceramic capacitors are stacked film, others are rolled. Given the several examples illustrated above, it is apparent that the teachings of this invention can be used with such capacitor elements of other design, materials and construction if they are fabricated in, or assembled into an appropriate shape and are terminated according to the teachings of this invention.

I claim:

1. A capacitor comprising a capacitor element having a first electrode terminated on a first metal end cap and a second electrode terminated on a second metal end cap the capacitor element and the first and second metal end caps enclosing an axial cavity the capacitor element further having at least a first hole through the capacitor element from the axial cavity out of the capacitor;

a first termination for connecting to an external circuit bonded to the first metal end cap outside of the first metal end cap a second termination for connecting to the external circuit bonded to the second metal end cap outside of the second metal end cap and a third termination for connecting to the external circuit bonded to the first metal end cap within the first metal end cap and passing out of the capacitor through the axial cavity and the at least a first hole.

2. The capacitor of claim 1 wherein the capacitor is a capacitor for attenuating a high frequency alternating voltage and the first metal end cap and the second metal end cap each have a thickness which is large compared to a penetration depth of the high frequency alternating voltage.

3. A capacitor comprising a capacitor element having a first electrode terminated on a first metal end cap and a second electrode terminated on a second metal end cap the capacitor element and the first and second metal end caps enclosing an axial cavity the capacitor element further having at least a first hole through the capacitor element from the axial cavity out of the capacitor;

a first termination for connecting to an external circuit bonded to the first metal end cap outside of the first metal end cap a second termination for connecting to the external circuit bonded to the second metal end cap outside of the second metal end cap, a third termination for connecting to the external circuit bonded to the first metal end cap within the first metal end cap and passing out of the capacitor through the axial cavity and the at least a first hole, and a fourth termination for connecting to the external circuit bonded to the second metal end cap within the second metal end cap and passing out of the capacitor through the axial cavity and the at least a first hole.

4. The capacitor of claim 3 wherein the capacitor is a capacitor for attenuating a high frequency alternating voltage and the first metal end cap and the second metal end cap each have a thickness which is large compared to a penetration depth of the high frequency alternating voltage.

5. A capacitor comprising a first capacitor element having a first electrode terminated on a first metal end cap and a second electrode terminated on a metal connector a second capacitor element having a first electrode terminated on the metal connector and a second electrode terminated on a second metal end cap the first capacitor element, the second capacitor element the metal connector and the first and second end caps enclosing an axial cavity the capacitor further having at least a first hole through at least one of the first capacitor element, the second capacitor element and the metal connector from the axial cavity going out of the capacitor a first termination for connecting to an external circuit bonded to the first metal end cap outside the first metal end cap a second termination for connecting to the external circuit bonded to the second metal end cap outside the second metal end cap a third termination for connecting to the external circuit bonded to the first metal end cap inside the first metal end cap and passing out of the capacitor through the axial cavity and the at least a first hole, and a fourth termination for connecting to the external circuit bonded to the second metal end cap inside the second metal end cap and passing out of the capacitor through the axial cavity and the at least a first hole.

6. The capacitor of claim 5 further comprising a fifth termination for connecting to the external circuit bonded to the metal connector outside the metal connector.

7. The capacitor of claim 5 further comprising a fifth termination for connecting to the external circuit bonded to the metal connector within the metal connector and passing out of the capacitor through the axial cavity and the at least a first hole through the capacitor element.

8. The capacitor of claim 5 wherein the capacitor is a capacitor for attenuating a high frequency alternating voltage and the first metal end cap; the second metal end cap and the metal connector each have a thickness which is large compared to a penetration depth of the high frequency alternating voltage.

9. A capacitor comprising at least a first capacitor element having a first electrode terminated on a first metal end cap and a second electrode terminated on a second metal end cap the at least a first capacitor element further having at least a first hole through the at least a first capacitor element going out of the capacitor;

a first termination for connecting to an external circuit bonded to the first metal end cap within the first metal end cap and passing out of the capacitor through the at least a first hole through the capacitor element, and a second termination for connecting to the external circuit bonded to the second metal end cap within the second metal end cap and passing out of the capacitor through the at least a first hole through the capacitor element.

10. The capacitor of claim 9 as a four terminal capacitor wherein the capacitor element is at least one of a tubular capacitor element and a stacked film capacitor element and further comprising a third termination for connecting to the external circuit bonded to the first metal end cap outside the first metal end cap, and a fourth termination for connecting to the external circuit bonded to the second metal end cap outside the second metal end cap.

11. The capacitor of claim 9 wherein the capacitor is a capacitor for attenuating a high frequency alternating voltage and the first metal end cap and the second metal end cap each have a thickness which is large compared to a penetration depth of the high frequency alternating voltage.

12. A capacitor comprising at least a first capacitor element having a first electrode terminated on a first metal end cap and a second electrode terminated on a second metal end cap the at least a first capacitor element further having at least one hole through the capacitor element going out of the capacitor;

a first termination for connecting to an external circuit bonded to at least one of the first metal end cap and the second metal end cap outside of the at least one of the first metal end cap and the second metal end cap, and a second termination for connecting to the external circuit bonded to at least one of the first metal end cap and the second metal end cap within the at least one of the first metal end cap and the second metal end cap and passing out of the capacitor through the at least one hole through the capacitor element.

13. The capacitor of claim 12 wherein the capacitor is a capacitor for attenuating a high frequency alternating voltage and the first metal end cap and the second metal end cap each have a thickness which is large compared to a penetration depth of the high frequency alternating voltage.

* * * * *